N. B. Reynolds,
Dressing Stone.

No. 57,571. Patented Aug. 28, 1866.

Witnesses.
Jno. D. Patten
L. W. Fogg

Inventor.
Napoleon B. Reynolds,
By atty A. B. Stoughton

UNITED STATES PATENT OFFICE.

N. B. REYNOLDS, OF AUBURN, NEW YORK.

IMPROVED MACHINE FOR GRINDING TOOLS, &c.

Specification forming part of Letters Patent No. 57,571, dated August 28, 1866.

*To all whom it may concern:*

Be it known that I, NAPOLEON B. REYNOLDS, of Auburn, in the county of Cayuga and State of New York, have invented certain new and useful Improvements in Machines for Grinding Cutting-Instruments or any other grinding purpose or operation; and I do hereby declare that the following is a full, clear, and exact description of the same, reference being had to the accompanying drawings, making a part of this specification, in which—

Figure 1:
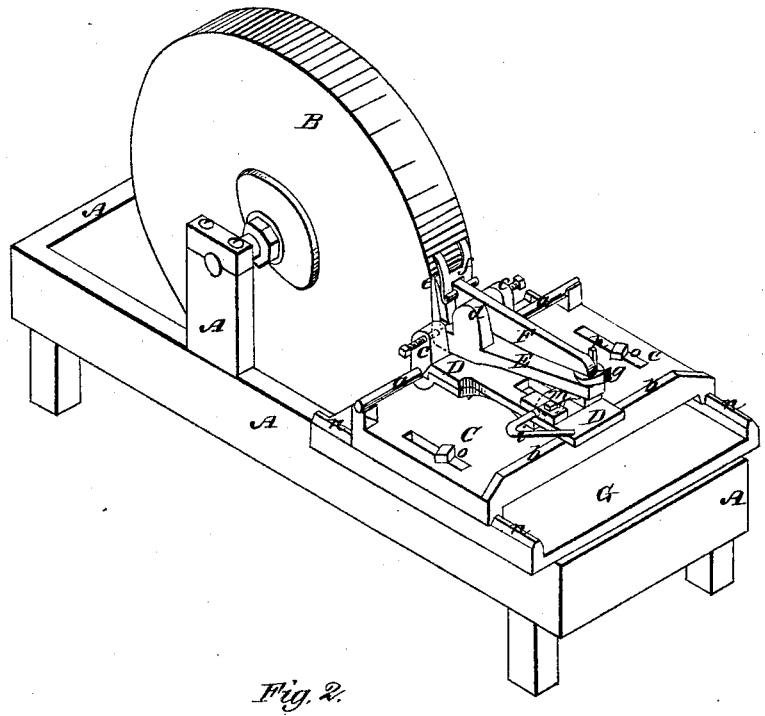
Figure 2:
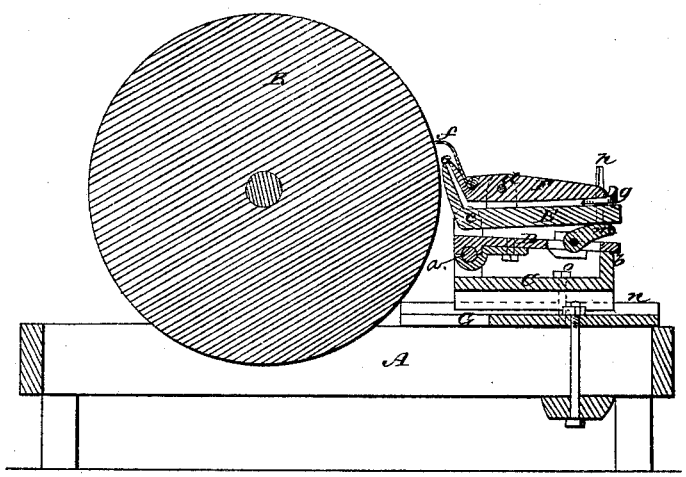

Figure 1 represents, in perspective, a grinding-machine with my improvements attached, and Fig. 2 represents a longitudinal vertical section through the same.

Similar letters of reference, where they occur in the separate figures, denote like parts of the machine in both of the drawings.

In rapid grinding by machinery the grindstone receives a polish, which prevents it from taking hold of the article being ground, its gritty or sharp nature being impaired by the polish or hard smooth surface which it acquires, and, in consequence, the process is prolonged and made expensive. Attempts have been made to prevent the stone from taking this polished surface by placing a roller or scraper against the surface of the revolving stone. These rather increase than diminish the tendency to harden or polish, and the only certain way of removing this polished surface was to stop the stone and hack the grinding-surface with a suitable instrument or tool, which not only consumed time in itself, but stopped the use of the stone during this sharpening or hacking process.

The object and purpose of my invention is to so contrive as that the stone shall be prevented from polishing, or that it shall maintain its sharp gritty nature constantly in the operation of grinding, and thus avoid the necessity of stopping the stone or of hacking it by hand, as heretofore done; and my invention consists in so combining with a grindstone an instrument that receives a vibrating motion against the face of the stone while running and in use, which vibrating or tapping motion shall accomplish the same end and purpose that the hacking by hand accomplishes, and thus keep the stone constantly sharp while in use, and very much expedite the grinding or reducing.

To enable others skilled in the art to make and use my invention, I will proceed to describe the same with reference to the drawings.

A represents a frame, in which a grindstone, B, is hung, and may be driven by any first moving power. At one end of the frame there is a rest or table, c, which can be adjusted to or from the stone, as may become necessary, and on this adjustable rest there are ways $a\,b$, on which a plate, D, can be moved and guided past the face of the stone B. To lugs $c$ on the front part of the plate D there is pivoted one leg, E, of a pair of griping-tongs, $e$, the other leg, F, being pivoted to that E at the point $d$.

The article to be ground having been placed between the jaws $e$ of the griping-tongs E F, in which they may be placed or set by a gage, $f$, the cam $g$ is turned around by a handle on its stem $h$, which spreads the legs E F and closes the jaws $e$ tightly upon the article to be ground.

At the rear of the plate $c$ there is hung a crank-rod, $i$, which has upon it a tappet or cam, $m$, underneath the lower leg, E, of the griping-tongs, so that by working said crank or rod the tappet or cam will cause the tongs holding the thing to be ground to have a vibratory or tapping motion toward and from the stone, in addition to its traversing motion past the face of the stone.

In the machine herein represented and described I use the blank that is being ground as the instrument for thus preventing the polish of the surface of the stone, and thus keeping it sharp by causing it to vibrate against its surface. The article thus ground being generally of steel, it answers the purpose satisfactorily. It is obvious, however, that a separate instrument may be used instead of the blank, and that it may be vibrated by the tongs or by a separate arrangement, either worked by hand or automatically from the stone or the power that drives the stone.

It is not necessary that this tapping-instrument should be continuously operated, but only when it is found that the stone is becoming glazed or polished, and then its use for a few minutes will be all that is required. I prefer, however, to use the blank itself for the hacking-instrument, as it seems to expedite the abrasion of the metal, as well as the sharpening of the stone itself. The traverse motion of the blank past the stone prevents the latter from wearing away unevenly, while its vibratory motion to and from the stone keeps it sharp without resorting to the usual method of hacking.

Instead of the rest or plate C lying immediately on frame A, it may rest upon an under or bed-plate, G, which latter lies upon the frame, and is furnished with ways $n\,n$, on which the upper plate, C, may accurately move to or from the stone, and then, when properly adjusted, be clamped to the bed-plate, as at $o\,o$; and, instead of this vibrating sharpening-instrument being placed in front of the stone, where the grinding is done, it may be placed at the rear or elsewhere, and accomplish the same purpose. I prefer, however, as above stated, to use the blank that is being ground as the instrument that is to peck or vibrate against the grinding-surface of the stone.

Having thus fully described my invention, what I claim therein as new, and desire to secure by Letters Patent, is—

1. In combination with a revolving grindstone, a tapping-instrument which, on being vibrated, hacks the surface of the stone, and thus prevents it from glazing or polishing, constructed and operating substantially as herein described.

2. In combination with a pair of clamping-tongs that are pivoted to a plate or rest traversed by guiding-ways which extend past the face of the stone, a tappet or cam, $m$, for vibrating said tongs upon its pivot, substantially as herein described.

NAPOLEON B. REYNOLDS.

Witnesses:
E. B. IVES,
JOHN H. OSBORNE.